(12) United States Patent
Wallaert et al.

(10) Patent No.: US 8,875,395 B2
(45) Date of Patent: Nov. 4, 2014

(54) MANUFACTURING HEAT EXCHANGER FROM POROUS MEDIUM AND CONDUITS

(75) Inventors: Franky Wallaert, Ingelmunster (BE); Peter De Jaeger, Waarmaarde (BE); Johan Hugelier, Harelbeke (BE)

(73) Assignee: Universiteit Gent, Ghent (BE)

( * ) Notice: Subject to any disclaimer, the term of this patent is extended or adjusted under 35 U.S.C. 154(b) by 44 days.

(21) Appl. No.: 13/503,993

(22) PCT Filed: Oct. 13, 2010

(86) PCT No.: PCT/EP2010/065356
§ 371 (c)(1),
(2), (4) Date: Apr. 25, 2012

(87) PCT Pub. No.: WO2011/051106
PCT Pub. Date: May 5, 2011

(65) Prior Publication Data
US 2012/0210581 A1 Aug. 23, 2012

(30) Foreign Application Priority Data

Oct. 29, 2009 (EP) .................................... 09174407

(51) Int. Cl.
| | |
|---|---|
| *B21D 53/06* | (2006.01) |
| *B23P 15/26* | (2006.01) |
| *C22C 1/08* | (2006.01) |
| *B22F 7/00* | (2006.01) |
| *B22F 3/00* | (2006.01) |
| *F28F 13/00* | (2006.01) |
| *C21B 7/10* | (2006.01) |

(52) U.S. Cl.
CPC ........... *F28F 13/003* (2013.01); *B22F 2998/10* (2013.01); *C21B 7/10* (2013.01); *C22C 1/08* (2013.01); *F28F 2215/12* (2013.01); *B22F 7/004* (2013.01); *B22F 3/002* (2013.01); *F28F 2275/18* (2013.01); *F28F 2275/12* (2013.01)
USPC ............ 29/890.045; 29/890.035; 29/890.054; 29/505

(58) Field of Classification Search
CPC ............... B23P 15/26; F28F 1/12; F28F 1/38; F28F 7/02; F28F 13/003; F28F 21/084; F28F 2215/12; F28F 2275/12; F28F 2275/18
See application file for complete search history.

(56) References Cited

U.S. PATENT DOCUMENTS

| | | | |
|---|---|---|---|
| 3,946,039 A | 3/1976 | Walz | |
| 4,285,385 A * | 8/1981 | Hayashi et al. | ................... 164/9 |

(Continued)

FOREIGN PATENT DOCUMENTS

| | | |
|---|---|---|
| EP | 1 227 908 | 10/2003 |
| EP | 1 533 586 A1 | 5/2005 |

(Continued)

*Primary Examiner* — Alexander P Taousakis
*Assistant Examiner* — Matthew P Travers
(74) *Attorney, Agent, or Firm* — Foley & Lardner LLP (57) ABSTRACT

The present invention relates to a method for producing a heat exchanger. The heat exchanger comprising at least one heat conducting conduit for passage of a first medium and at least one block of an open cell porous medium for passage of a second medium. The method comprises providing at least one groove in the open cell porous medium. Thereafter, the porous medium is bent in a direction such that at least part of the grooves are opened and heat conducting conduits are applied in this at least one opened groove. Thereafter, the porous medium is rebend such that the heat conducting conduits are locked in said open cell porous medium.

19 Claims, 5 Drawing Sheets

(56) References Cited

U.S. PATENT DOCUMENTS

| | | |
|---|---|---|
| 5,042,560 A | 8/1991 | Ahlers |
| 5,086,836 A * | 2/1992 | Barth et al. .................. 165/164 |
| 5,467,816 A | 11/1995 | Larinoff |
| 6,857,461 B2 | 2/2005 | Girlich et al. |
| 2006/0096750 A1* | 5/2006 | Meuzelaar .................. 165/181 |
| 2008/0078532 A1 | 4/2008 | Nagashima et al. |
| 2009/0131950 A1* | 5/2009 | Liu et al. .................. 606/94 |

FOREIGN PATENT DOCUMENTS

| | | |
|---|---|---|
| EP | 1 584 695 A1 | 10/2005 |
| EP | 1 604 756 B1 | 3/2007 |
| FR | 2 738 625 A3 | 3/1997 |
| WO | WO 00/56440 A1 | 9/2000 |
| WO | WO 02/093644 A2 | 11/2002 |
| WO | WO 03/100339 A1 | 12/2003 |
| WO | WO 2005/004483 A2 | 1/2005 |

\* cited by examiner

MANUFACTURING HEAT EXCHANGER FROM POROUS MEDIUM AND CONDUITS

TECHNICAL FIELD

The present invention relates to a method for the production of a heat exchanger. More particularly, the present invention relates to a method for the production of a heat exchanger which is built from open cell porous media, e.g. open cell metal foam, and heat conducting conduits.

The invention further relates to the heat exchanger and use of such heat exchangers for heat exchanging applications, such as cooling and heating e.g. airco systems and automotive cooling.

BACKGROUND ART

There exists already a broad range of heat exchangers, most of them using metal fins. The heat exchanging capacity of these fins is optimised in such a way that further improvements are expected to be minimal, but even minimal improvements would be highly appreciated, especially in the automotive field as this would enable car producers to miniaturise the heat exchangers and thereby lower the weight of the cars.

A disadvantage of finned heat exchangers is their dependency on the flow direction of the fluid passing the fins, therefore it was proposed in the art to use isotropic open cell foams instead of finned structures as heat exchange enhancing structures in heat exchangers. Such foamed heat exchangers are described in e.g. FR2738625 and WO 03/100339.

One of the problems observed in the production of such open cell metal foam heat exchangers is that the assembly of the open cell metal foam heat exchanger is a labour intensive activity. Slicing or other machining processes of open cell metal foam and also other open cell porous media can cause the open cell porous medium to compress locally, to disrupt locally or to deteriorate the open cell porous structure and thus also of the heat exchanging properties of the open cell porous medium.

DISCLOSURE OF INVENTION

The object of the invention is to provide a method for production of an open cell porous medium heat exchanger which is less labour intensive and improves thermal performance in comparison with a conventional stack technology, where slices are prepared and mounted between tubes, as e.g. described in FIG. 1 of FR2738625.

An aspect of the claimed invention provides a method for producing a heat exchanger. The method comprises the following steps: first, at least one heat conducting conduit for passage of a first medium and at least one block of an open cell porous medium for passage of a second medium are provided. The open cell porous medium is then, e.g. by machining, provided with at least one groove. Preferably, in case multiple grooves are applied, at least part of the grooves are parallel to one another. In an alternative preferred embodiment, part of the grooves are in one direction and parallel to one another, and another part of the grooves are in a direction perpendicular to said first grooves and also parallel to one another. It must be understood that any groove setup can be used to obtain the benefits of the present invention. Thereafter, the porous medium is bent in a direction such that at least part of the grooves are opened. Heat conducting conduits are then applied in this at least one opened groove. The at least one heat conducting conduit is preferably a metal tube, more preferably a flat tube, which might optionally be provided with internal fin structures. In an alternative preferred embodiment, the metal tubes are round tubes, optionally provided with internal fin structures. In a further alternative embodiment, metal tubes with different diameters can be combined into the heat exchanger. Thereafter, the porous medium is rebent such that the heat conducting conduits are locked in said open cell porous medium. In one preferred embodiment, the rebending is such that the porous medium is straightened out to its original shape.

In an alternative embodiment, the method further comprises bending the porous medium, before application of the heat conducting conduits, in a direction which was made possible by at least part of the grooves such that bent heat conducting conduits can be applied in the porous medium.

Preferably, the open cell porous media are thermally conductive open cell porous media. This can be a carbon or graphite foam, preferably reticulated foam; a carbon or graphite containing metal foam, preferably reticulated foam; metal foam, preferably reticulated metal foam as described e.g. in EP1227908; a woven or knitted 3D textile in metal, graphite or carbon; a 3D wire structure made of metal, graphite or carbon, such as e.g. the Kagome structure or similar 3D-structures as described in WO2005/04483.

In a preferred aspect, the open cell porous medium is made of a heat conducting metal, preferably of nickel, copper, magnesium, aluminium or alloys thereof.

Preferably, the open cell porous medium is open cell metal foam, preferably reticulated metal foam, with pores per inch (ppi's) ranging between 5 and 40 ppi. More preferably, the ppi's are ranging between 10 and 30 ppi, even more preferably ranging between 15 and 25 ppi. Most preferably, the open cell metal foam is 20 ppi.

In a further preferred aspect, the open cell metal foam is made of aluminium or an aluminium alloy. In another preferred aspect, the metal foam is made of copper or a copper alloy. In a more preferred aspect the metal foam is made of graphite or comprises graphite.

Preferably, the porous medium is an aluminium or aluminium alloy foam. Preferably, the numbers of pores per inch (ppi's) of the porous medium is ranging between 5 and 40 ppi.

The open cell porous medium can have any thickness. Preferably a thickness ranging between 5 and 50 mm, more preferably in between 10 and 40 mm. Most preferably in between 15 and 30 mm as this thickness proved to be the optimal set point for the pressure drop combined with the heat exchange enlarging effect.

Upon the production of the groove in the porous medium, e.g. by machining, the solid parts of the porous medium get damaged in one or another way. When severely damaged, the solid parts are jerked away near the machining or cutting edge. When metal porous media are used, most of the machining methods cause a spread of the solid parts e.g. due to melting of the metal. Because in the method of the present invention, the porous medium needs only to be provided with the grooves, the front and back face of the porous medium block will not be altered and there will be no effect on flow through the porous medium. Furthermore, it is also possible to enclose the tubes almost completely in a very simple way, without compressing the foam in the flow direction, where it would result in a pressure drop penalty.

The open cell porous media can be provided with the groove(s) in any method of removing material for obtaining the grooves in the porous media. Examples of such methods comprise cutting, sawing, milling, laser cutting, spark and electro-chemical erosion and water jet cutting. An advantage of such machining in the method of the present invention, is that the grooves can be machined at tolerances of $\frac{1}{10}$ mm smaller than the actual width of the heat conducting conduits used in the production of the heat exchanger. This results in a small compression of the porous medium at the contact surface between the heat conducting conduits and the porous medium, but the remainder of the porous medium will remain unaffected. This small compression of the porous medium enlarges the contact surface between the conduit and the porous medium which enhances the heat exchange between the conduit and the porous medium.

Preferably, the porous medium containing the at least one heat conducting conduit is further joined with collecting tanks to both ends of the at least one heat conducting conduit. Preferably, the collecting tanks are thermally attached to the heat exchanging stack.

In a preferred aspect, the at least one heat conducting conduit is bonded to the porous medium by the use of a bonding layer which was attached to the heat conducting conduit. Such bonding layer can be a brazing foil, a brazing paste, an epoxy, a high thermal conductive paste, a cladding layer or any similar product. Bonding of the heat conducting conduits with the porous medium enhances the heat exchanging properties of the heat exchanger.

In another preferred aspect, the bonding is done by using a (thermally conductive) epoxy, a high thermal conductive paste, a thermally conductive glue, a brazing paste, a thermally conductive metal layer, e.g. brazing foil, a cladding layer or any similar product.

Another aspect of the claimed invention provides a heat exchanger obtained from the methods described above.

Another aspect of the claimed invention provides use of the heat exchanger as obtained from the method of the present invention.

DEFINITIONS

The term "second medium" is to be understood in the light of this invention as meaning a gaseous substance. In the light of this invention "first medium" can be gaseous, but also liquid substances.

The term "open cell porous medium" is to be understood in the light of this invention as a porous medium with interconnecting porosity. The porous medium must be understood to be a two phases product with voids and solid parts wherein the voids are interconnected and the solid parts, which define the voids, are also interconnected.

The term "open cell metal foam" is to be understood as a metal foam with interconnecting porosity, e.g. reticulated foam. Such metal foams are e.g. described in EP1604756, EP1227908, U.S. Pat. No. 5,042,560, U.S. Pat. No. 3,946,039.

BRIEF DESCRIPTION OF DRAWINGS

Example embodiments of the invention are described hereinafter with reference to the accompanying drawings in which.

REFERENCE NUMBERS

10 porous medium
12 groove
14 flat heat conducting conduit
16 round heat conducting conduit
18 bent flat tubes
20 bent flat tubes

MODE(S) FOR CARRYING OUT THE INVENTION

Examples of a method for the preparation of a heat exchanger according to the present invention and corresponding heat exchangers will now be described with reference to FIGS. 1 to 4.

Figure 1:
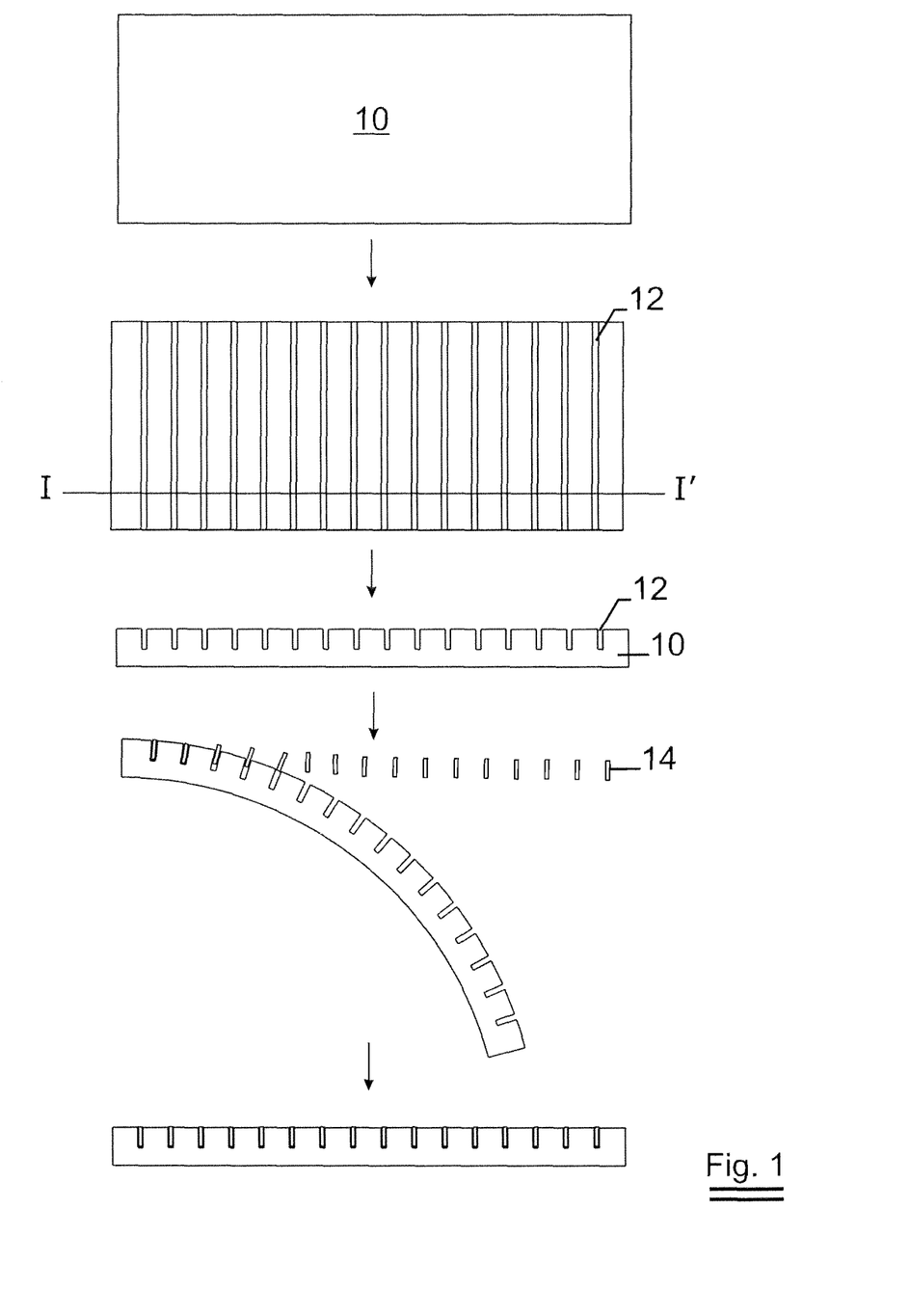
FIG. 1 shows a production method of an example embodiment of the present invention.

FIG. 1 is an example of a production method of a heat exchanger according to the present invention. FIG. 1 starts with a frontview of a block of open cell porous medium 10 with the desired thickness. Grooves 12 are applied in this block of open cell porous medium 10. The grooves 12 can be applied by use of a simple circular saw or band saw. The third step in FIG. 1 shows the grooved porous medium according to I-I'. The grooved porous medium block is then bent in a direction which opens the grooves 12, as shown in the fourth step in FIG. 1. Thereafter flat tubes 14 are put in those grooves 12. Once the tubes are applied, the porous medium is bent back to its original form and the flat tubes are locked. In a preferred example, the open cell porous medium 10 is open cell aluminium foam which is filled with aluminum tubes and using an aluminum alloy containing brazing paste for the bonding step. The tubes are thereafter brazed to the aluminium foam as is known in the art.

Figure 2:
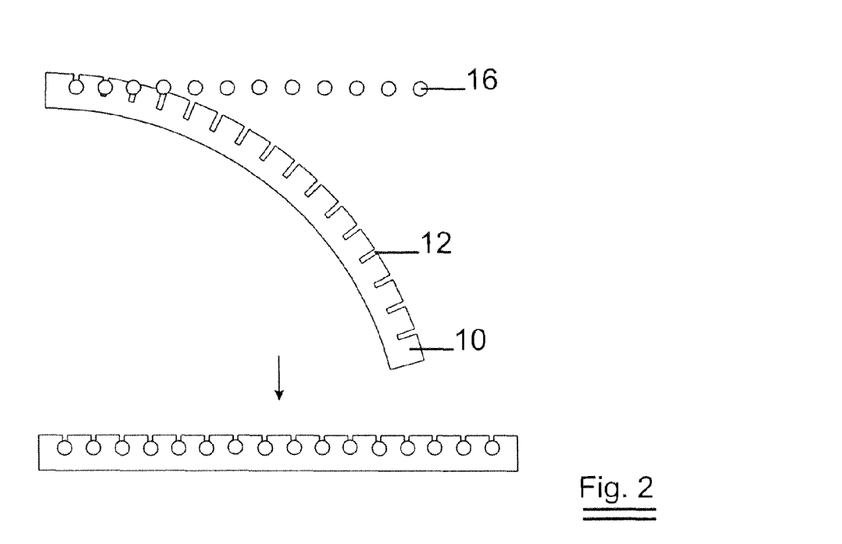
FIG. 2 is an alternative example embodiment of the present invention.

FIG. 2 shows some steps of a production method of a heat exchanger according to an alternative embodiment of the present invention. In FIG. 2 the grooves 12 in an open cell porous medium 10 are filled with round tubes. Thereafter the porous medium 10 is bent back to its original form and the round tubes are locked.

Figure 3:
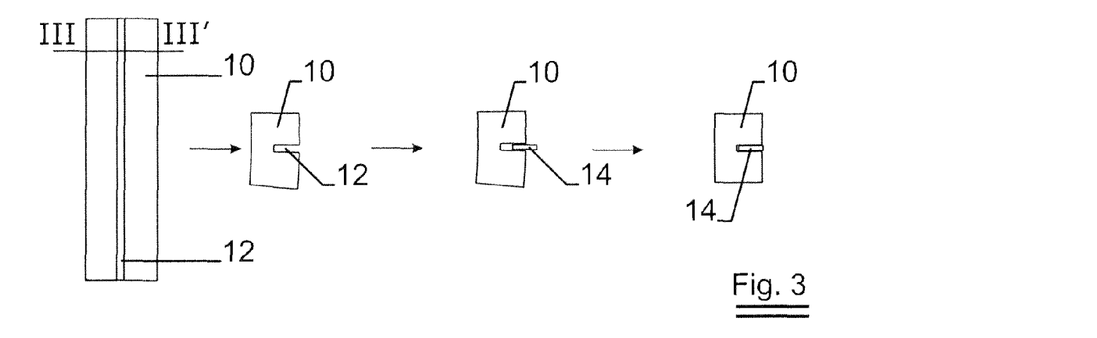
FIG. 3 shows an alternative example embodiment of the present invention.

FIG. 3 shows another example embodiment of the present invention. A block of open cell porous medium is provided with only one groove 12, as can be seen in the first step of FIG. 3 showing a front view of the open cell porous medium. The porous medium is bent in the direction which opens the groove 12, as shown in the second step which is a view according to III-III'. The groove is filled with a flat tube 14 (shown in the third step of FIG. 3) and thereafter the porous medium is bent back to its original form and the flat tube is locked in the porous medium (last step in FIG. 3). In a preferred embodiment, the flat tube is then bonded to the porous medium, preferably by using a thermally conductive bonding method.

Figure 4:
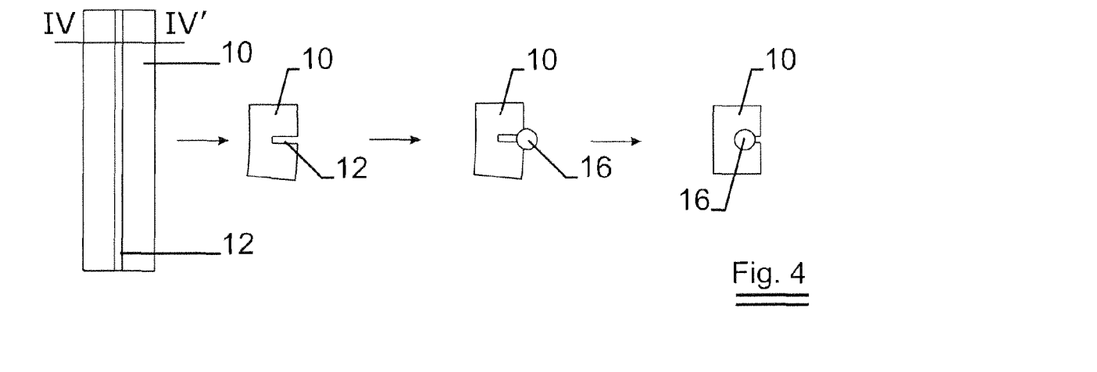
FIG. 4 shows a further alternative example embodiment of the present invention.

FIG. 4 shows still another example embodiment of the present invention. A block of open cell porous medium is provided with only one groove 12, as can be seen in the first step of FIG. 4, showing a front view of the open cell porous medium. The porous medium is bent in the direction which opens the groove 12, as shown in the second step which is a view along IV-IV'. The groove is filled with a round tube 14 (shown in the third step of FIG. 4) and thereafter the porous medium is bent back to its original form and the round tube is locked in the porous medium (the last step in FIG. 4). In a preferred embodiment, the round tube is then bonded to the porous medium, preferably by using a thermally conductive bonding method.

Figure 5A:
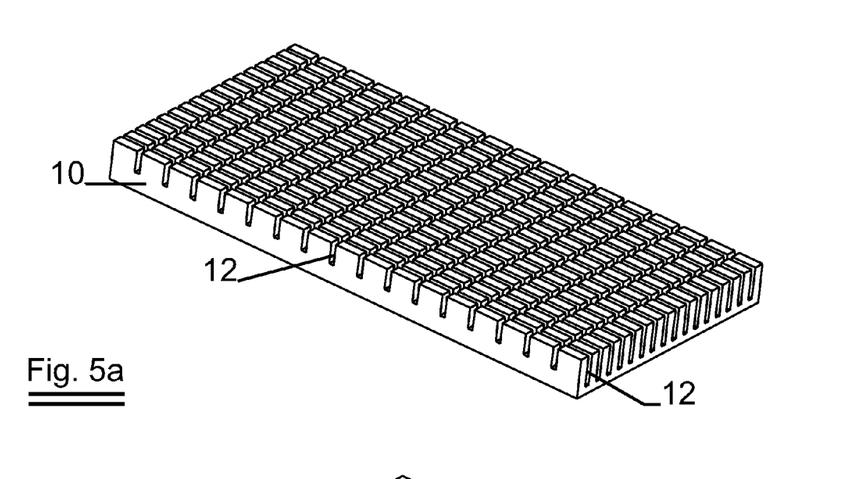
FIG. 5 shows a production method of an alternative example embodiment of the present invention.
Figure 5B:
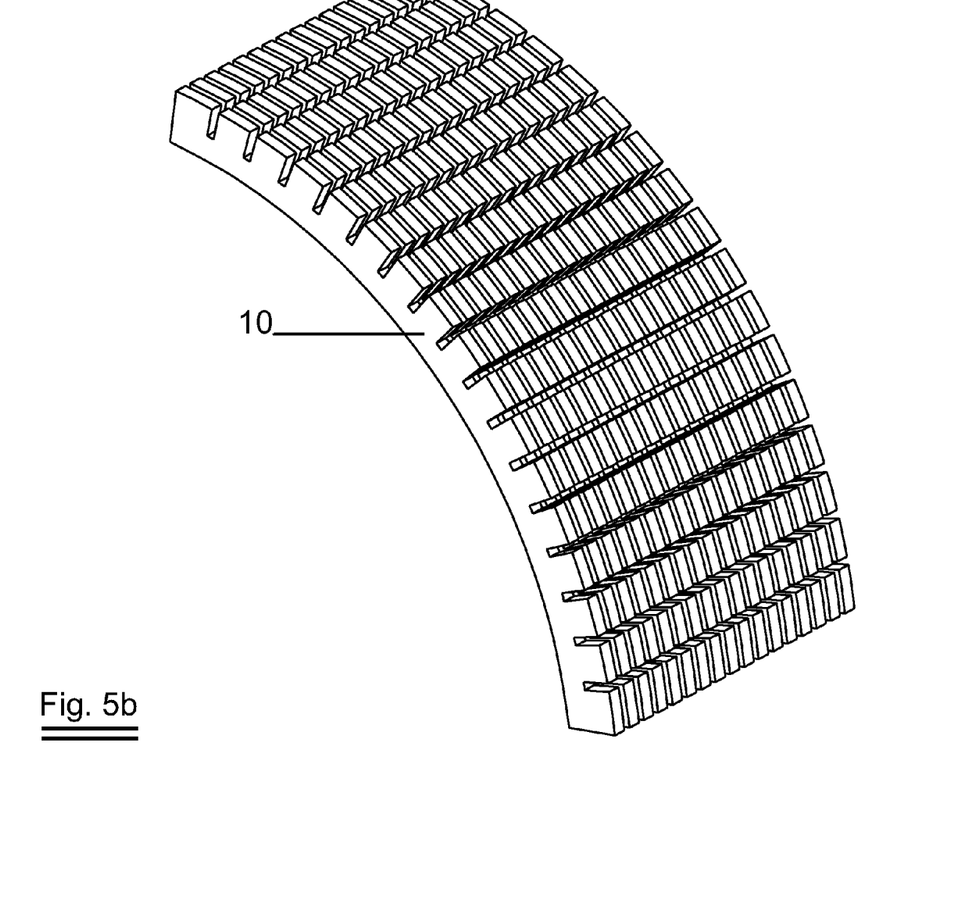
Figure 5C:
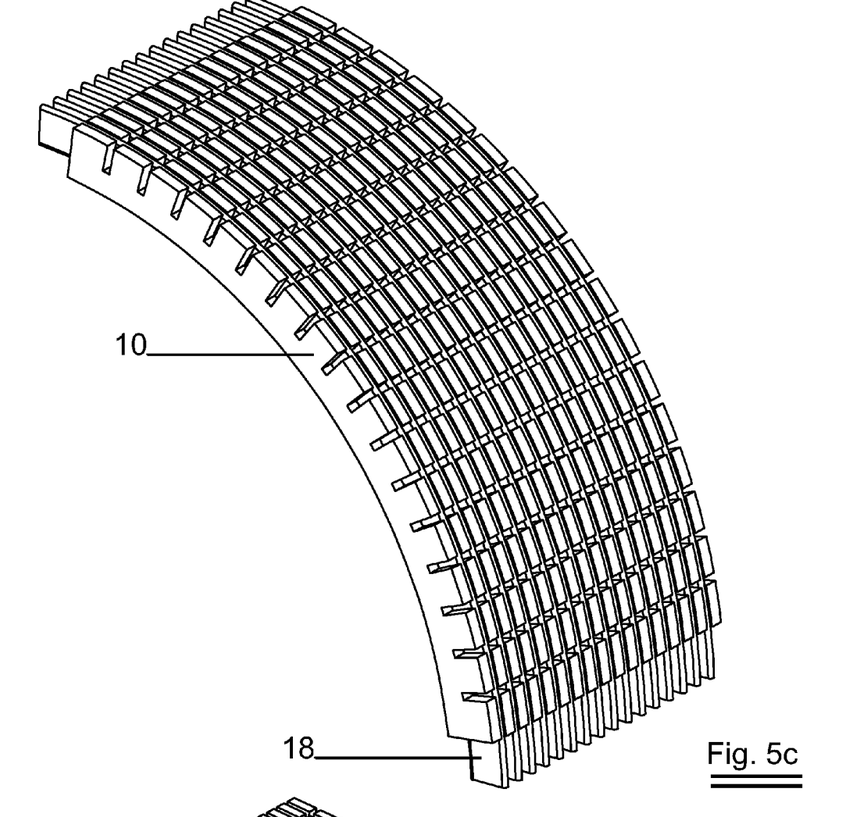

FIG. 5 shows a further example embodiment of the present invention. A block of open cell porous medium 10 is provided with two sets of parallel grooves 12, wherein the first set of parallel grooves is perpendicular to the second set of parallel grooves, as shown in FIG. 5A. According to a preferred embodiment of the present invention, the porous medium 10 is bent in a direction which was made possible by at least part of the grooves 12, in this example the shorter grooves are used for the first bending of the porous medium 10, as shown in FIG. 5b. Thereafter the longer grooves are opened by bending in a direction which is perpendicular to the first bending step (not shown), and flat bent heat conducting conduits 18 are applied in the opened grooves. Thereafter, as shown in FIG. 5c, the porous medium 10 is bent such that the bent flat heat conducting conduits 18 get locked in the porous medium 10, but the shape as obtained in FIG. 5b is still preserved. This method enables the easy production of 3D heat exchangers comprising open cell porous media, preferably open cell metal foams.

Figure 6A:
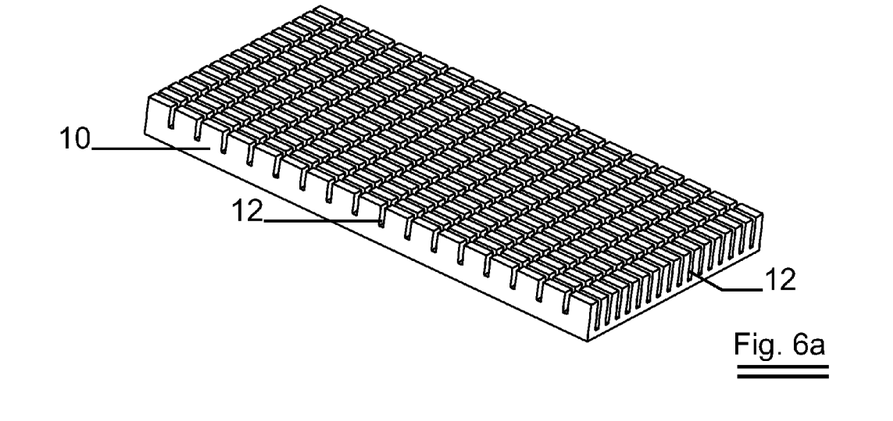
FIG. 6 shows a further alternative example embodiment of the present invention.
Figure 6B:
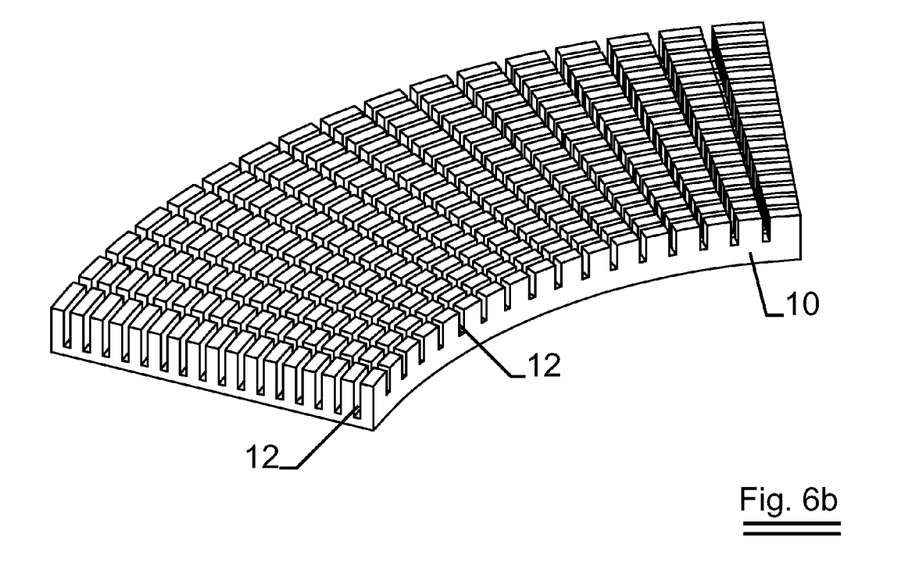
Figure 6C:
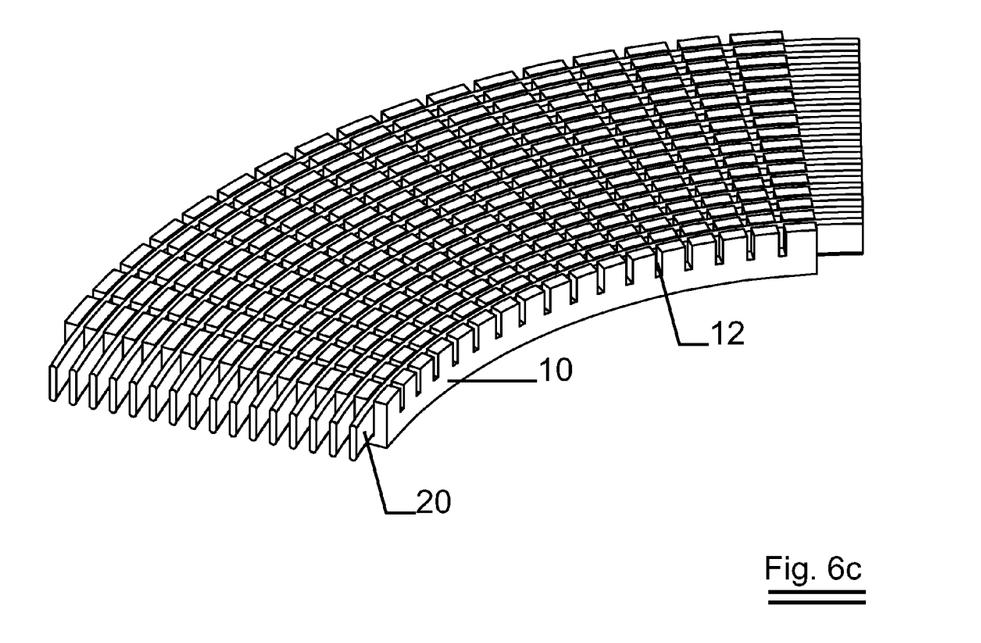

FIG. 6 shows another further example embodiment of the present invention. A block of open cell porous medium 10 is provided with two sets of parallel grooves 12, wherein the first set of parallel grooves is perpendicular to the second set of parallel grooves, as shown in FIG. 6A. According to an alternative preferred embodiment of the present invention, the porous medium 10 is bent in a direction which was made possible by at least part of the grooves 12, in this example the longer grooves are used for the first bending of the porous medium 10, as shown in FIG. 6b. Thereafter the shorter grooves are opened by bending in a direction which is perpendicular to the first bending step (not shown), and flat bent heat conducting conduits 20 are applied in the opened grooves. Thereafter, as shown in FIG. 6c, the porous medium 10 is bent such that the bent flat heat conducting conduits 20 get locked in the porous medium 10, but the shape as obtained in FIG. 6b is still preserved. This method also enables the easy production of 3D heat exchangers comprising open cell porous media, preferably open cell metal foams.

Thus, there has been described a method for producing a porous medium heat exchanger in a very easy and labour effective way. The heat exchanger comprises at least one heat conducting conduit for passage of a first medium and at least one block of an open cell porous medium for passage of a second medium. The method comprises providing at least one groove in the open cell porous medium. Thereafter, the porous medium is bent in a direction such that at least part of the grooves are opened and heat conducting conduits are applied in this at least one opened groove. Thereafter, the porous medium is rebent such that the heat conducting conduits are locked in said open cell porous medium.

The invention claimed is:

1. A method of producing a heat exchanger, said method comprising:
   providing a plurality of heat conducting conduits configured to permit passage of a first medium, including at least one heat conducting conduit comprising a metal tube;
   providing at least one block of an open-cell porous medium of open-cell metal foam configured to permit passage of a second medium;
   providing a first plurality of grooves in said porous medium such that the porous medium becomes grooved, and such that the first plurality of grooves are disposed in a first orientation and in a same alignment relative to each other;
   bending said grooved porous medium in a direction, such that at least a plurality of said grooves are opened;
   applying said plurality of heat conducting conduits in said at least a plurality of opened grooves; and
   bending said grooved porous medium in an opposite direction such that said plurality of heat conducting conduits get locked in said open-cell porous medium.

2. The method of producing a heat exchanger as in claim 1, said method further comprising
   providing a second plurality of grooves differing from the first plurality of grooves in said porous medium, and
   bending the porous medium in a direction permitted by the second plurality of grooves and which enables application of bent tubes.

3. The method of producing a heat exchanger as in claim 2, said method further comprising
   bonding said plurality of heat conducting conduits to said open-cell porous medium.

4. The method of producing a heat exchanger as in claim 1, said method further comprising
   bonding said plurality of heat conducting conduits to said open-cell porous medium.

5. The method of producing a heat exchanger as in claim 4, wherein said plurality of heat conducting conduits are provided with a bonding layer.

6. The method of producing a heat exchanger as in claim 4, wherein
   said bonding comprises applying an epoxy, high thermal conductive paste, brazing paste or a cladding layer.

7. The method of producing a heat exchanger as in claim 1, wherein at least one of said plurality of heat conducting conduits comprises a flat tube.

8. The method of producing a heat exchanger as in claim 1, wherein said alignment is parallel.

9. The method of producing a heat exchanger as in claim 1, wherein said open-cell metal foam is thermally conducting.

10. The method of producing a heat exchanger as in claim 9, wherein said metal foam is aluminium or aluminium alloy foam.

11. The method of claim 1, further comprising:
    providing a second plurality of grooves in the porous medium such that the second plurality of grooves are disposed in a second orientation different from the first orientation and in a same alignment relative to each other.

12. The method of claim 11, wherein the first plurality of grooves are disposed in the first orientation and in the same alignment so as to be parallel to each other and perpendicular to the second plurality of grooves.

13. The method of claim 11, wherein the first plurality of grooves comprise shorter grooves than the second plurality of grooves.

14. The method of claim 1, wherein the first plurality of grooves are perpendicular to a second plurality of grooves.

15. A method of producing a heat exchanger, the method comprising:
    providing a plurality of heat conducting conduits in an array, the conduits being configured to permit passage of a first medium and comprising at least one metal tube;
    providing at least one block of an open-cell porous medium of open-cell metal foam configured to permit passage of a second medium;
    providing a first plurality of grooves in the porous medium such that the porous medium becomes grooved, and such that the first plurality of grooves are disposed in a first orientation and in a same alignment relative to each other;

bending said grooved porous medium in a direction, thereby opening the first plurality of grooves;

applying said array in the opened first plurality of grooves; and bending the grooved porous medium in an opposite direction such that the array gets locked in said open-cell porous medium.

16. The method of claim 15, further comprising:

providing a second plurality of grooves in the porous medium such that the second plurality of grooves are disposed in a second orientation different from the first orientation and in a same alignment relative to each other.

17. The method of claim 16, wherein the first plurality of grooves are disposed in the first orientation and in the same alignment so as to be parallel to each other and perpendicular to the second plurality of grooves.

18. The method of claim 15, wherein the first plurality of grooves are perpendicular to a second plurality of grooves.

19. A method of producing a heat exchanger, said method comprising:

providing a plurality of heat conducting conduits configured to permit passage of a first medium, including at least one heat conducting conduit comprising a metal tube;

providing at least one block of an open-cell porous medium comprising metal foam or a three-dimensional textile configured to permit passage of a second medium;

providing a first plurality of grooves in said porous medium such that the porous medium becomes grooved, and such that the first plurality of grooves are disposed in a first orientation and in a same alignment relative to each other;

bending said grooved porous medium in a direction, such that at least a plurality of said grooves are opened;

applying said plurality of heat conducting conduits in said at least a plurality of opened grooves; and bending said grooved porous medium in an opposite direction such that said plurality of heat conducting conduits get locked in said open-cell porous medium.

* * * * *